No. 788,614. PATENTED MAY 2, 1905.
E. WEBB.
MULTIPLE TOOL.
APPLICATION FILED MAY 16, 1904.
2 SHEETS—SHEET 2.
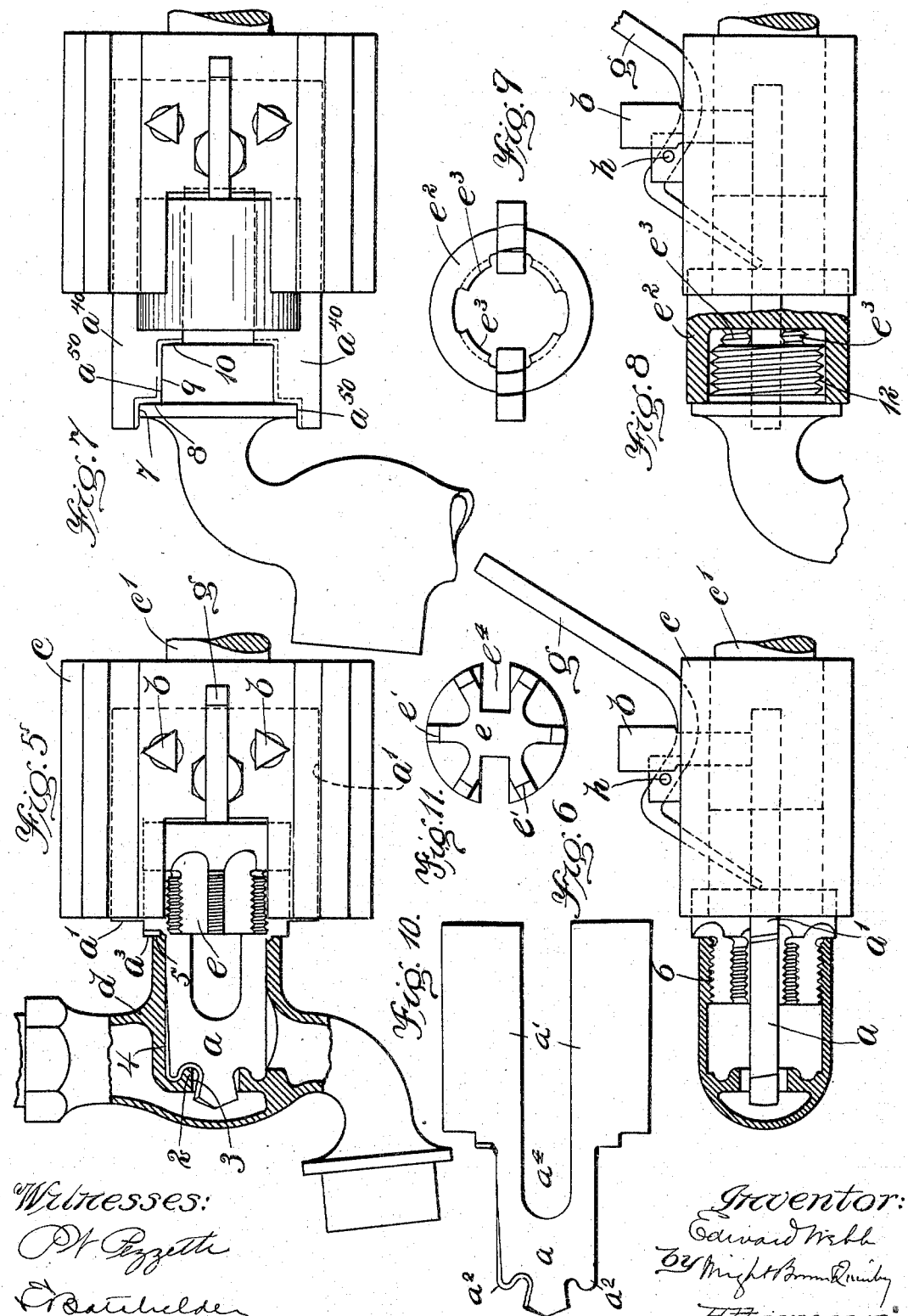
Witnesses:
Inventor:
Edward Webb
Attorneys No. 788,614. Patented May 2, 1905.

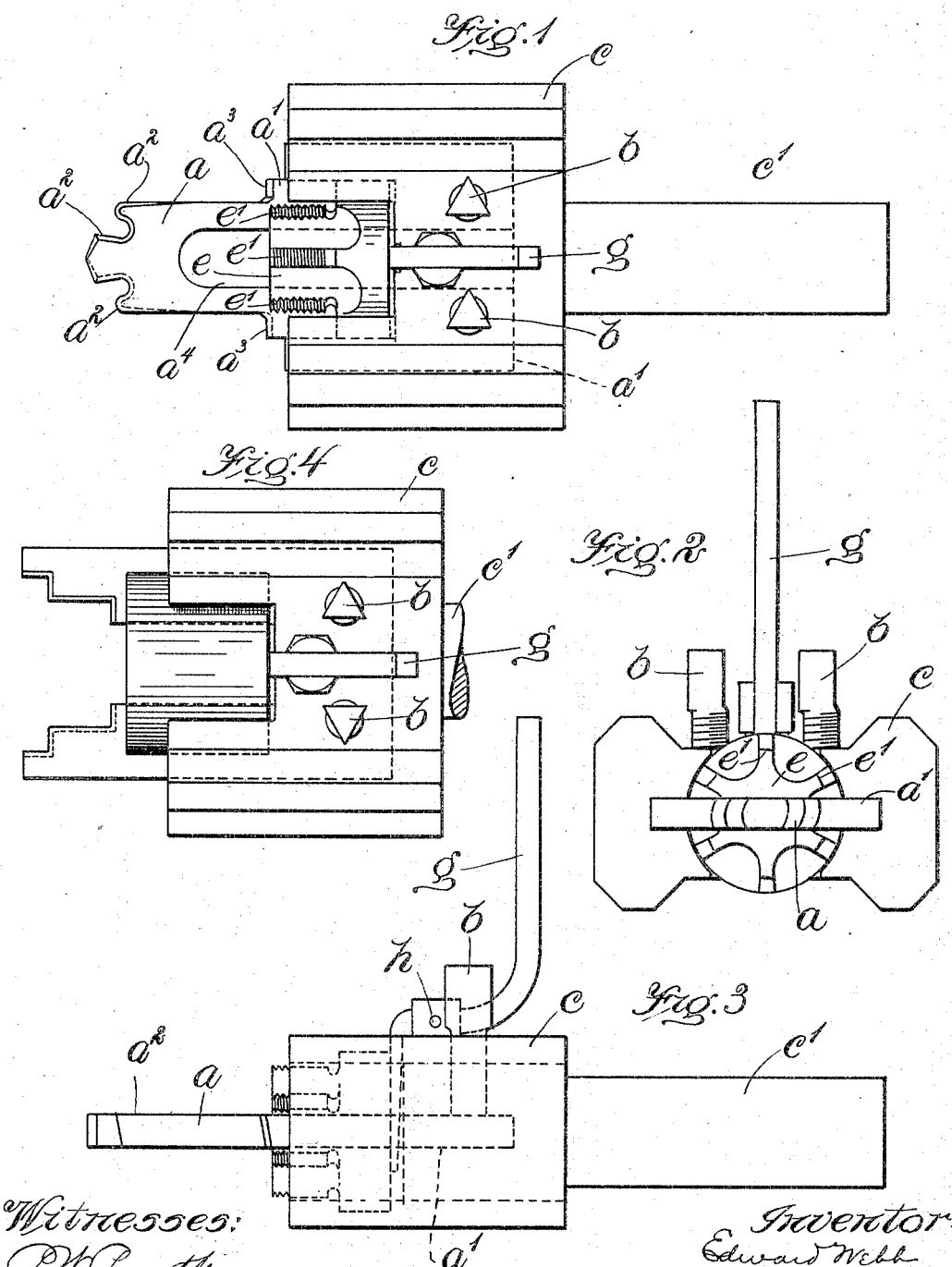

UNITED STATES PATENT OFFICE.

EDWARD WEBB, OF READING, MASSACHUSETTS, ASSIGNOR OF ONE-HALF TO JULIAN D'ESTE, OF SALEM, MASSACHUSETTS.

MULTIPLE TOOL.

SPECIFICATION forming part of Letters Patent No. 788,614, dated May 2, 1905.

Application filed May 16, 1904. Serial No. 208,093.

*To all whom it may concern:*

Be it known that I, EDWARD WEBB, of Reading, in the county of Middlesex and State of Massachusetts, have invented certain new and useful Improvements in Multiple Tools, of which the following is a specification.

This invention relates to metal-working tools, and particularly to tools adapted for use on turret or monitor lathes for turning surfaces on castings or other pieces of work which are rotated while being presented to the tool, the latter having no rotary movement.

The invention has for its object to provide a multiple tool adapted to first form a smooth concentric surface or surfaces on a piece of work and then to form a screw-thread on the same piece.

The invention consists in the improvements which I will now proceed to describe and claim.

Of the accompanying drawings, forming a part of this specification, Figure 1 represents a plan view of a tool embodying my invention. Fig. 2 represents an end view of the same. Fig. 3 represents a side view. Fig. 4 represents a plan view of a differently-formed tool embodying the invention. Figs. 5 and 6 represent a plan view and a side view of the tool shown in Figs. 1, 2, and 3 and a piece of work on which the tool is operating. Figs. 7 and 8 represent, respectively, a plan and a side view of the tool shown in Fig. 4 and a piece of work on which the tool is operating. Fig. 9 represents an end view of the tool shown in Figs. 4, 7, and 8. Fig. 10 represents a plan view of the cutter shown in Figs. 1, 2, and 3. Fig. 11 represents an end view of the tap detached from the cutter.

The same reference characters indicate the same parts in all the figures.

Referring first to Figs. 1, 2, 3, 5, and 6, $a$ represents a cutter, the shank $a'$ of which is secured by set-screws $b$ to a holder $c$, the latter having a shank $c'$, adapted to be secured to a lathe-turret. The holder is preferably provided with a socket in which the cutter-shank $a'$ fits snugly. The cutter is provided with suitable cutting edges $a^2$, which are backed off to afford the clearance required in metal-turning tools, so that when a rotating piece of work is presented to said edges the latter will turn off portions of the surface of the work. The cutting edges are here shown as of the contour required to finish the valve-seat 2 of a faucet-casing $d$ and the adjacent portions 3 4 at opposite sides of the valve-seat, as shown in Fig. 5. Additional cutting edges $a^3$ are provided, these being arranged to finish the outer end of the casing-neck, as shown at 5. I do not limit myself, however, to any particular form and arrangement of cutting edges, as these will in all cases be modified according to the nature and requirements of the work. $e$ represents a tap which is adapted to slide on the cutter $a$ and is a substantially cylindrical piece or block longitudinally grooved to form a series of ribs $e'$, which are serrated and backed off in such manner that they are adapted to coöperate in cutting a screw-thread 6 in the neck of the casing $d$, as shown in Fig. 6. The tap $e$ and cutter $a$ are formed so that the tap is free to slide lengthwise on the cutter, the thread-cutting portions of the tap being kept at all times substantially equidistant from the longitudinal center of the cutter. The cutter is preferably provided with a longitudinal slot $a^4$, which extends through the shank of the cutter to its rear end, as shown by dotted lines in Fig. 1, and the tap is provided with longitudinal grooves $e^4$ at opposite sides, said grooves embracing the outer edges of the slot $a^4$ and having an accurate sliding fit thereon. The tap is therefore adapted to be retracted, as shown in Figs. 1, 3, and 5, while the cutter is acting on the work and then projected to engage and enter the work, as shown in Fig. 6. To project the tap, I provide a lever $g$, which is pivoted at $h$ to ears on the holder $c$. One arm of the lever bears on the rear end of the tap, while its other arm projects from the holder and serves as a handle. When said handle is forced backwardly, the lever exerts forward pressure on the tap, causing it to engage the work. The pressure of the lever on the tap may be continued until the completion of the thread, although this is not necessary, since the engagement of the forward teeth of the tap with the work will cause the tap to advance until its work is completed.

In the foregoing description it is assumed that the cutter and tap do not rotate and that the work is rotated while being presented to the said parts. It is obvious, however, that the multiple tool may be rotated, the work having no rotation, although in such case the lever $g$ would not be practicable as a means for advancing the tap and the latter would have to be advanced by some other means.

In Figs. 4, 7, 8, and 9 I show a form of multiple tool adapted to first form external smooth surfaces, such as the surfaces 7, 8, 9, and 10, on a faucet-casing $d$, as shown in Fig. 7, and then to form an external screw-thread 12 on the surface 9, as shown in Fig. 8. The acting portion of the cutter is in this case composed of two arms $a^{40} a^{40}$, having stepped and backed-off cutting edges $a^{50}$. The thread-forming member of the tool is a die $e^2$, which is a hollow shell having internal ribs $e^3$ serrated, backed off, and relatively arranged to form the external screw-thread 12. The die $e^2$ may also be projected by a lever, as indicated in Fig. 8. The lever which projects the thread-forming member (which may be either a tap or a die) may be operated either by hand or automatically to project said member when the cutter has sufficiently prepared the way. I do not limit myself, however, to the provision of a special device for projecting the tap or die, it being obvious that the feed movement of the tool may be utilized for this purpose, the tap or die being arranged to reach and engage the work before the completion of the feed movement, so that it will be caused to form one or more thread convolutions before the cessation of the feed movement. The engagement thus effected between the tap or die and the work is sufficient to cause the rotation of the work to continue the forward movement of the tap or die after the feed movement of the tool as a whole ceases.

Various other changes may be made in the form and arrangement of the parts of my improved multiple tool without departing from the nature and spirit of the invention.

I claim—

1. A multiple tool for attachment to a lathe, said tool comprising a cutter, a thread-forming member movable lengthwise relatively to the cutter and having a free sliding engagement therewith, and means for moving the said member upon the cutter, means being provided to prevent rotation of said member relatively to the cutter.

2. A multiple tool for attachment to a lathe, said tool comprising a holder, a cutter affixed to the holder and constituting a guide, and a thread-forming member having a free sliding engagement with the cutter, means being provided to prevent rotation of said member relatively to the cutter.

3. A multiple tool for attachment to a lathe, said tool comprising a holder, a cutter affixed to the holder and constituting a guide, a thread-forming member having a free sliding engagement with the cutter, and a device pivoted to the holder for moving said member, means being provided to prevent rotation of said member relatively to the cutter.

In testimony whereof I have affixed my signature in presence of two witnesses.

EDWARD WEBB.

Witnesses:
C. F. BROWN,
E. BATCHELDER.